United States Patent [19]

Coury et al.

[11] Patent Number: 5,001,210
[45] Date of Patent: * Mar. 19, 1991

[54] METHOD FOR PRODUCING POLYURETHANES FROM POLY-(HYDROXYALKYL URETHANES)

[75] Inventors: Arthur J. Coury, St Paul; Christopher M. Hobot, Tonka Bay, both of Minn.

[73] Assignee: Medtronic, Inc., Minneapolis, Minn.

[*] Notice: The portion of the term of this patent subsequent to Nov. 28, 2006 has been disclaimed.

[21] Appl. No.: 416,798

[22] Filed: Oct. 3, 1989

Related U.S. Application Data

[63] Continuation-in-part of Ser. No. 251,261, Sep. 30, 1988, Pat. No. 4,883,854.

[51] Int. Cl.$^5$ .............................................. C08G 18/30
[52] U.S. Cl. ...................................................... 528/85
[58] Field of Search ......................................... 528/85

[56] References Cited

U.S. PATENT DOCUMENTS

| | | | |
|---|---|---|---|
| 2,627,524 | 2/1953 | Malkemus | 260/482 |
| 2,802,022 | 8/1957 | Groszos | 260/471 |
| 2,824,857 | 2/1958 | Drechsel | 260/77.5 |
| 3,629,319 | 12/1971 | Jonaitis | 260/468 C |
| 3,703,520 | 11/1972 | Carleton | 260/268 T |
| 3,763,217 | 10/1973 | Brill | 260/471 C |
| 4,028,299 | 6/1977 | Olstowski | 260/30.4 N |
| 4,180,673 | 12/1979 | Burguette | 560/26 |
| 4,268,683 | 5/1981 | Gurgiolo | 560/24 |
| 4,484,994 | 11/1984 | Jacobs, III et al. | 204/101 C |
| 4,704,446 | 11/1987 | Goel | 528/78 |

FOREIGN PATENT DOCUMENTS

| | | |
|---|---|---|
| 0016332 | 10/1980 | European Pat. Off. . |
| 0048368 | 3/1982 | European Pat. Off. . |
| 0125466 | 11/1984 | European Pat. Off. . |
| 0280815 | 9/1988 | European Pat. Off. . |
| 3504336 | 8/1986 | Fed. Rep. of Germany . |
| 689705 | 4/1953 | United Kingdom . |

Primary Examiner—Maurice J. Welsh
Attorney, Agent, or Firm—Reed A. Duthler

[57] ABSTRACT

By reacting polyamines with cyclic carbonates, di-poly-(hydroxyalkyl urethanes) are produced. These diols and polyols are particularly useful for the synthesis of polyurethanes by reaction with diisocyanates or polyisocyanates.

13 Claims, No Drawings

METHOD FOR PRODUCING POLYURETHANES FROM POLY-(HYDROXYALKYL URETHANES)

CROSS REFERENCE TO COPENDING APPLICATIONS

This application is a continuation in part of U.S. Pat. Application Ser. No. 07/251,261 filed Sept. 30, 1988 by Coury and Hobot for "HYDROXYL FUNCTIONAL MONOMERS" and now U.S. Pat. No. 4,883,854.

Reference is also made to commonly assigned U.S. Pat. Application Ser. No. 07/251,418, for "NOVEL SEGMENTED POLYURETHANES", by Coury et al, filed Sept. 30, 1988 and now U.S. Pat. No. 4,873,308.

BACKGROUND OF THE INVENTION

This invention relates to the formation of hydroxyl functional monomers in general, and in particular to the formation of hydroxyl functional monomers useful in the synthesis of polyurethanes.

Synthesis of polyurethanes by reacting isocyanates and alcohols is well known to the art. Typically, long or medium chain diols or polyols are used to provide the "soft" segments of segmented polyurethanes. These polyols generally consist of hydroxyl terminated polyethers or polyesters. Reaction of these polyols with polyisocyanates produces polyether or polyester urethanes, respectively. Short chain polyols are often reacted with polyisocyanates to form the "hard" segments of segmented polyurethanes.

Unfortunately, commercial availability of polyols appropriate for use in the synthesis of polyurethanes is sometimes limited. However, certain polyamines having backbones appropriate for polymer synthesis are more readily available. They may be reacted with polyisocyanates, to form polyureas. However, reactions between polyamines and polyisocyanates are often too fast to allow for commercially feasible production. Moreover, polyureas generally have limited thermal processability.

SUMMARY OF THE INVENTION

The present invention provides a method of producing hydroxyalkyl urethanes, including diols and polyols, from readily available polyamines, including diamines. These polyols readily and controllably polyols readily and controllably react with polyisocyanates, including diisocyanates, to produce polyurethanes. Ether and ester free polyols according to the present invention are believed particularly advantageous for fabrication of polyurethanes for use in biomedical applications. Such polyurethanes are discussed in detail in copending Pat. Application Ser. No. 07/251,418, by Coury et al for "NOVEL SEGMENTED POLYURETHANES", filed Sept. 30, 1988 and assigned to Medtronic, Inc. This application is hereby incorporated by reference in its entirety herein.

DESCRIPTION OF THE INVENTION

As discussed in the above-cited Coury et al application, in some applications requiring elastoplastic polyurethanes, inclusion of the dimer acid backbone in the "soft" segments of segmented polyurethanes is particularly desirable. The dimer acids are described and discussed in the book "The Dimer Acids", edited by Edward C. Leonard, published by *Humco Shefield Chemical,* 1975, incorporated by reference herein in its entirety. Dimer acids are the reaction product of a Diels-Alder addition or other coupling process of two aliphatic, unsaturated, predominantly 18 carbon fatty acids. Dimer acids take the form of single ring, double ring or branched chain structures predominantly having two carboxylic acid functionalities.

Dimer acid based products commercially available include dimer isocyanate, dimer amine, and dimerol. All three are produced beginning with dimer acid, and include the 36 carbon dimer acid backbone. Representing the 36 carbon dimer acid backbone as "D", the formula for dimerol is HO—D—OH, the formula for dimer isocyanate is OCN—D—NCO, and the formula for dimer amine is $H_2N$—D—$NH_2$. While dimerol may be reacted with diisocyanates to produce polyurethanes, dimer amine is presently more readily obtainable.

Other polyamines are also appropriate for use in the claimed invention. These include primary and secondary polyamines with hydrocarbon backbones, such as hexamethylene diamine, piperazine, 1,4-diaminobutane, xylylene diamines, 4,4-diaminodicyclohexylmethane, isophorone diamine, 1,3-diaminopropane and similar compounds. In addition, the invention allows for inclusion of a variety of polymer backbones in polyurethanes. Examples include polydimethyl siloxane (PDMS), a silicone polymer, available from Petrarch Systems with aminopropyl termination (PDMS diamine) and polyoxypropylene diamines. Other amino terminated polymeric materials based on polyethers, polycarbonates, polyamides and polyesters are also believed useful in the present invention. Shorter chain polyamines which include ether, ester, or carbonate functional groups may also be used. The present invention allows any desired polyamine which is free of cyclic carbonate-reactive functional groups (other than amines) to be converted to urethane polyols and then to be incorporated in polyurethanes.

The present invention may be practiced using ethylene carbonate, propylene carbonate, butylene carbonate, and other homologs of ethylene carbonate having the following general functional formula:

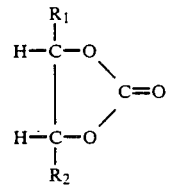

In the above formula, $R_1$ and $R_2$ represent hydrogen or alkyl groups, preferably hydrogen, methyl or ethyl groups. Propylene carbonate, like ethylene carbonate is especially desirable as it reacts quickly with amines to form urethanes, without the necessity of catalysts.

The polyols produced may be reacted with one or more polyisocyanates, including diisocyanates, to produce polyurethanes. Long chain diamines and the diols produced therefrom are particularly useful in fabricating the "soft" segments of segmented polyurethanes. Examples 1–4 and 9–10 are illustrative. Short chain diamines and the diols produced therefrom are useful in producing the "hard" segments of segmented polyurethanes. Examples 4–7 are illustrative.

EXAMPLE 1

268.2 grams (1.00 eq.) of dimer amine and 89.0 grams (1.01 eq.) of ethylene carbonate (converted to a liquid by warming) were weighed into a nitrogen purged jar. A magnetic stirring bar was placed in the jar and it was covered. The mixture was warmed with stirring on a magnetic hot plate. The mixture cleared within 30 minutes and its viscosity rose. The mixture was stirred a total of 3 hours while the temperature was maintained between 70–90° C. Infrared spectroscopy indicated that the carbonate absorption (1800 cm$^{-1}$) had disappeared while being replaced by the expected urethane carbonyl peak (1700 cm$^{-1}$).

The product of Example 1, bis-hydroxyethyl dimer urethane (hereafter BHEDU diol) is useful in the preparation of a variety of polymers. The formula for BHEDU diol is HO—CH$_2$—CH$_2$—OOC—NH—D—NH—COO—CH$_2$—CH$_2$—OH, in which "D" represents the hydrocarbon backbone of dimer acid. In particular, it is useful in production of ether and ester free polyurethanes as disclosed in the above-cited, commonly pending application by Coury et al, for "NOVEL SEGMENTED POLYURETHANES". One example of a polyurethane produced employing the diol of Example 1 is set forth in Example 2, below.

In the event that propylene carbonate, or other homolog of ethylene carbonate is combined with dimer amine, the general formula for the resulting diol is:

In the above formula, R$_1$–R$_4$ preferably represent hydrogen or alkyl groups, and preferably represent hydrogen, methyl or ethyl groups.

EXAMPLE 2

29.1 grams (0.10 Eq.) of dimer diisocyanate were mixed with 7.4 grams (0.125 Eq.) of 1,6-hexane diol and 8.9 grams (0.025 Eq.) of BHEDU diol. The covered mixture was placed into a 250° F. oven until the solid 1,6-hexane diol melted. At that point, the mixture was removed from the oven and stirred for 10 minutes, and a drop of dibutyltin dilaurate was added to catalyze the reaction. The mixture was stirred until thickening indicated that the reaction was well underway. The covered mixture was returned to a 250° F. oven for 3 hours. After removing the mixture from the oven, 20.0 grams (0.15 Eq.) of 4,4'-diisocyanatodicyclohexlmethane (Desmodur-W ®, produced by Mobay, Inc.) and 4.5 grams (0.10 Eq.) of 1,4-butane diol were added to the mixture and stirred. The covered mixture was returned to the 250° F oven for 2 minutes, and removed and stirred until thickening indicated that polymerization was well underway. The covered mixture was returned to the oven overnight to complete the cure.

The resultant product is a solid elastoplastic polyurethane having an ultimate tensile strength of 3710 p.s.i., 100% secant modulus of 1613 p.s.i., 388% elongation at break and Shore hardness of 88A. The polyurethane produced is believed useful as an insulator for implantable electrical leads and/or as a coating or other functional portion of an implantable medical device.

The general method disclosed in Example 1 is also applicable to other polyamines to produce polyols including diols appropriate for use in production of polyurethanes and other polymers. Examples 3, 5, 7 and 9 disclose other urethane diols fabricated from a variety of primary and secondary diamines, to indicate the general applicability of the method to produce urethane polyols. Examples 4, 6, 8 and 10 demonstrate use of the urethane diols produced to produce polyurethanes.

EXAMPLE 3

403 grams (0.300 Eq.) of aminopropyl terminated polydimethylsiloxane (Petrarch Systems) and 26.64 grams (0.303 Eq.) of ethylene carbonate were combined in a reaction vessel previously dried with a purge of nitrogen. The ethylene carbonate was added first, then the diprimary amine. The mixture was initially incompatible. The mixture was stirred and heated on a magnetic hot plate at ambient temperature. The temperature was gradually increased from 40° C. to 105° C. over the first hour of heating and stirring. The temperature was gradually reduced to 60° C. over the next hour, and the heating element was turned off after 2 hours of stirring. The mixture was stirred for an additional 3 hours at room temperature. Infrared spectroscopy performed on samples of the resultant liquid indicated that the expected reaction had taken place to produce a urethane diol. PDMS diamine has the general formula H$_2$N—(CH$_2$)$_3$—PDMS—(CH$_2$)$_3$—NH$_2$ The formula for the resultant diol (PDMS urethane diol) is HO—CH$_2$—CH$_2$—OOC—NH—(CH$_2$)$_3$—PDMS—(CH$_2$)$_3$—NH—COO—CH$_2$CH$_2$—OH in which "PDMS" represents polydimethylsiloxane.

In the event that propylene carbonate or other homologs of ethylene carbonate are employed instead of ethylene carbonate, the general formula for the resulting diol is:

In the above formula, R$_1$–R$_4$ represent hydrogen or alkyl groups, and preferably represent hydrogen, methyl, or ethyl groups.

EXAMPLE 4

5.7 grams (0.004 Eq.) of the PDMS urethane diol prepared according to Example 3 were added to 28.62 grams (0.196 Eq.) of 9-hydroxymethyl octadecanol and 26.6 grams (0.200 Eq.) of 4,4-diisocyanatodicyclohexylmethane (Desmodur-W ®, produced by Mobay, Inc.). The reactants were mixed together in a beaker, and stirred. The mixture was then placed into a 250° F. vacuum oven for 10 minutes. The mixture was then removed, stirred for an additional 10 minutes and replaced in the oven for an additional 15 minutes. The mixture was then removed, stirred for 5 minutes and catalyzed with 1 drop of dibutyltin dilaurate. The mixture was stirred until thickening of the mixture made further stirring impossible. The mixture was placed back in the oven overnight to complete the cure. Samples of the material were compression molded at 420° F. The resulting polyurethane had ultimate tensile strength of 3370 p.s.i., yield strength 2960 p.s.i. at 7% elongation and 215% elongation at break. The polyurethane is a solid elastoplastic believed useful either as a coating, sheet or molded plastic.

EXAMPLE 5

86.14 grams (2.00 Eq.) of piperazine, manufactured by Aldrich Chemical Co. were combined with 184.8 grams (2.1 Eq.) of ethylene carbonate in a round bottom flask. The reactants were melted and mixed under magnetic stirring. The exothermic reaction elevated the temperature of the mixture to about 140° C., with temperature falling off after about 10 minutes. The mixture was thereafter heated to maintain a temperature of 100° C. After 18 hours, IR spectra were taken, indicating the expected conversion to a urethane diol. The resulting product is an amber liquid at 100° C., and is solid at room temperature. The structural formula for the urethane diol is:

EXAMPLE 6

74.46 grams (0.51 Eq.) of the urethane diol produced in Example 5 were combined with 148.73 grams (0.50 Eq.) of dimer isocyanate, and stirred until homogenous. The mixture was placed in a 250° F. oven, and allowed to react overnight. The resulting polyurethane was a solid polymer having an ultimate tensile strength of 1738 p.s.i., a 100% secant modulus of elasticity of 934 p.s.i. and 360% elongation at break. The resulting ether and ester free polyurethane is believed usable as a coating or an adhesive.

EXAMPLE 7

116.00 grams (2.0 Eq.) of hexane-1,6-diamine were combined with 184.80 grams (2.10 Eq.) of ethylene carbonate in a 1 liter round bottom flask. The reactants were heated until melted and mixed by magnetic stirring. The reaction was strongly exothermic, causing the temperature of the mixture to rise to 170° C., boiling some ethylene carbonate off. After 18 hours, IR spectra were taken, indicating conversion of the diamine to a urethane diol. The urethane diol is a red-brown solid at room temperature. The formula of the urethane diol is HO—CH$_2$—CH$_2$—OOC—NH—(CH$_2$)$_6$—NH—COO—CH$_2$—CH$_2$—OH.

EXAMPLE 8

148.73 grams (0.50 Eq.) of dimer isocyanate were combined with 66.81 grams (0.51 Eq.) of the urethane diol produced in Example 7, heated to 250° F. and mixed in order to produce a homogenous mixture. The mixture was allowed to react overnight at 250° F. The resulting product was a solid polymer having ultimate tensile strength of 1079 p.s.i., 100% secant modulus of elasticity of 328 p.s.i. and 656% elongation at break. This polyurethane is believed useful as an adhesive.

EXAMPLE 9

156.5 grams (0.5 Eq.) of Jeffamine ED 600, a polyalkyl ether diamine produced by Texaco were added to 44.9 grams (0.51 Eq.) of ethylene carbonate in a 500 mm flask under magnetic stirring sufficient to produce a vortex. The mixture was heated to 50° C. and maintained at that temperature over night to produce a polyalkyl ether urethane diol (Jeffamine methane diol). Jeffamine urethane diol is liquid at room temperature, and is believed to have the basic formula:

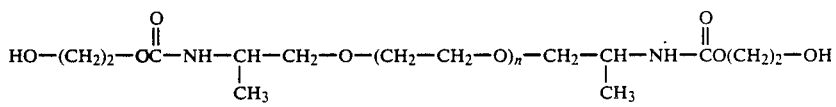

In the event that propylene carbonate or other homolog of ethylene carbonate is employed instead of ethylene carbonate, the formula for the resulting diol is:

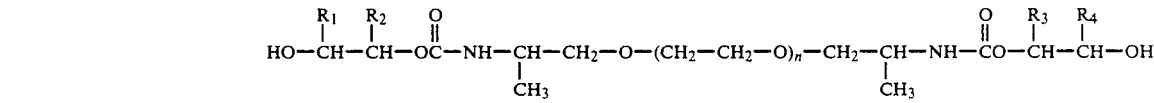

In the above formula, R$_1$-R$_4$ represent hydrogen or alkyl groups, and preferably represent hydrogen, methyl, or ethyl groups.

EXAMPLE 10

The diol produced in Example 9 above was dried over night at 100° C. under 30 mm Hg vacuum prior to use. 100.25 grams (0.25 Eq.) of the heated, dried diol were measured into a polypropylene beaker in a nitrogen purged dry box. 20.75 grams (0.25 Eq.) of cyclohexane diisocyanate were added to the diol, and the mixture was stirred until the cyclohexane diisocyanate was melted and the mixture was homogeneous. The homogeneous mixture was placed in a 125° C. oven under nitrogen purge to final cure. The product was a polyether urethane having an ultimate tensile strength of 1398 p.s.i., a 100% secant modulus of elasticity of 315 p.s.i., and 356% elongation at break.

The previous examples illustrate both the synthesis of urethane polyols and their use in synthesis of polyurethanes. The examples are intended to illustrate the claimed invention, and should not be construed as limiting the scope of the invention.

In conjunction with the invention disclosed above, We claim:

1. A method of producing a polyurethane including a desired moiety "M" comprising the steps of:
    selecting a compound having the formula A$_n$—M, in which "M" represents the moiety desired for incorporation into the polyurethane, "A" represents a primary or secondary amine group and "n" is a number greater or equal to 2;
    reacting said selected compound with a cyclic carbonate to produce a urethane polyol; and reacting said urethane polyol with one or more diisocyanates or polyisocyanates to produce a polyurethane.

2. A method of producing a polyurethane including a desired moiety "M" comprising the steps of:
selecting a compound having the formula A—M—A, in which "M" represents the moiety desired for incorporation into the polyurethane and in which "A" represents a primary or secondary amine group;
reacting said selected compound with a cyclic carbonate to produce a urethane diol; and
reacting said urethane diol with one or more diisocyanates or polyisocyanates to produce a polyurethane.

3. A method of incorporating a desired hydrocarbon moiety "R" into a polyurethane, comprising the steps of:
selecting a compound having the general formula $A_n$—R, wherein "A" represents a primary or secondary amine group, "R" represents the desired hydrocarbon moiety, and "n" is a number greater than or equal to 2;
reacting said selected compound with a cyclic carbonate to produce a urethane polyol; and
reacting said urethane polyol with one or more diisocyanates or polyisocyanates to produce a polyurethane.

4. A method of incorporating a desired hydrocarbon moiety "R" into a polyurethane, comprising the steps of:
selecting a compound having the general formula A—R—A, wherein "A" represents a primary or secondary amine group and wherein "R" represents the desired hydrocarbon moiety;
reacting said selected compound with a cyclic carbonate to produce a urethane diol; and
reacting said urethane diol with one or more diisocyanates or polyisocyanates to produce a polyurethane.

5. A method of producing a segmented polyurethane which incorporates the hydrocarbon backbone of dimer acid, comprising the steps of:
reacting dimer amine with a cyclic carbonate to produce a urethane diol; and
reacting the urethane diol produced in the previous step with one or more diisocyanates or polyisocyanates to produce a polyurethane.

6. A method of producing a segmented polyurethane which includes a polyether backbone, comprising the steps of reacting an amino terminated polyether with a cyclic carbonate to produce a polyether urethane polyol; and
reacting the urethane polyol produced in the previous step with one or more diisocyanates or polyisocyanates to produce a polyether urethane.

7. A method of producing a polyurethane which incorporates a polydimethylsiloxane backbone, comprising the steps of:
reacting amino terminated polydimethylsiloxane with a cyclic carbonate to produce a urethane diol; and
reacting the urethane diol produced in the previous step with one or more diisocyanates or polyisocyanates to produce a polyurethane.

8. A diol having the formula:

wherein $R_1$, $R_2$, $R_3$ and $R_4$ represent hydrogen or alkyl groups and wherein D represents a dimer acid backbone.

9. A diol according to claim 8 wherein $R_1$, $R_2$, $R_3$ and $R_4$ represent hydrogen, methyl or ethyl groups.

10. A diol having the formula:

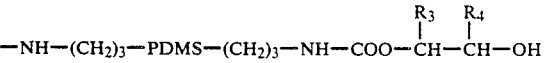

wherein $R_1$, $R_2$, $R_3$ and $R_4$ represent hydrogen or alkyl groups.

11. A diol according to claim 10 wherein $R_1$, $R_2$, $R_3$ and $R_4$ represent hydrogen, methyl or ethyl groups.

12. A diol having the formula:

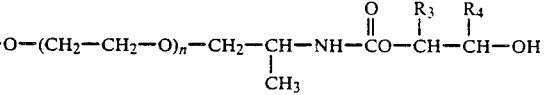

wherein $R_1$, $R_2$, $R_3$ and $R_4$ represent hydrogen or alkyl groups.

13. A diol according to claim 12 wherein $R_1$, $R_2$, $R_3$ and $R_4$ represent hydrogen hydrogen, methyl or ethyl or ethyl groups.

* * * * *